Feb. 4, 1964 B. DOYLE 3,120,617
CONTROL DEVICE FOR TRANSISTORIZED BRIDGE CIRCUIT
Filed April 25, 1960
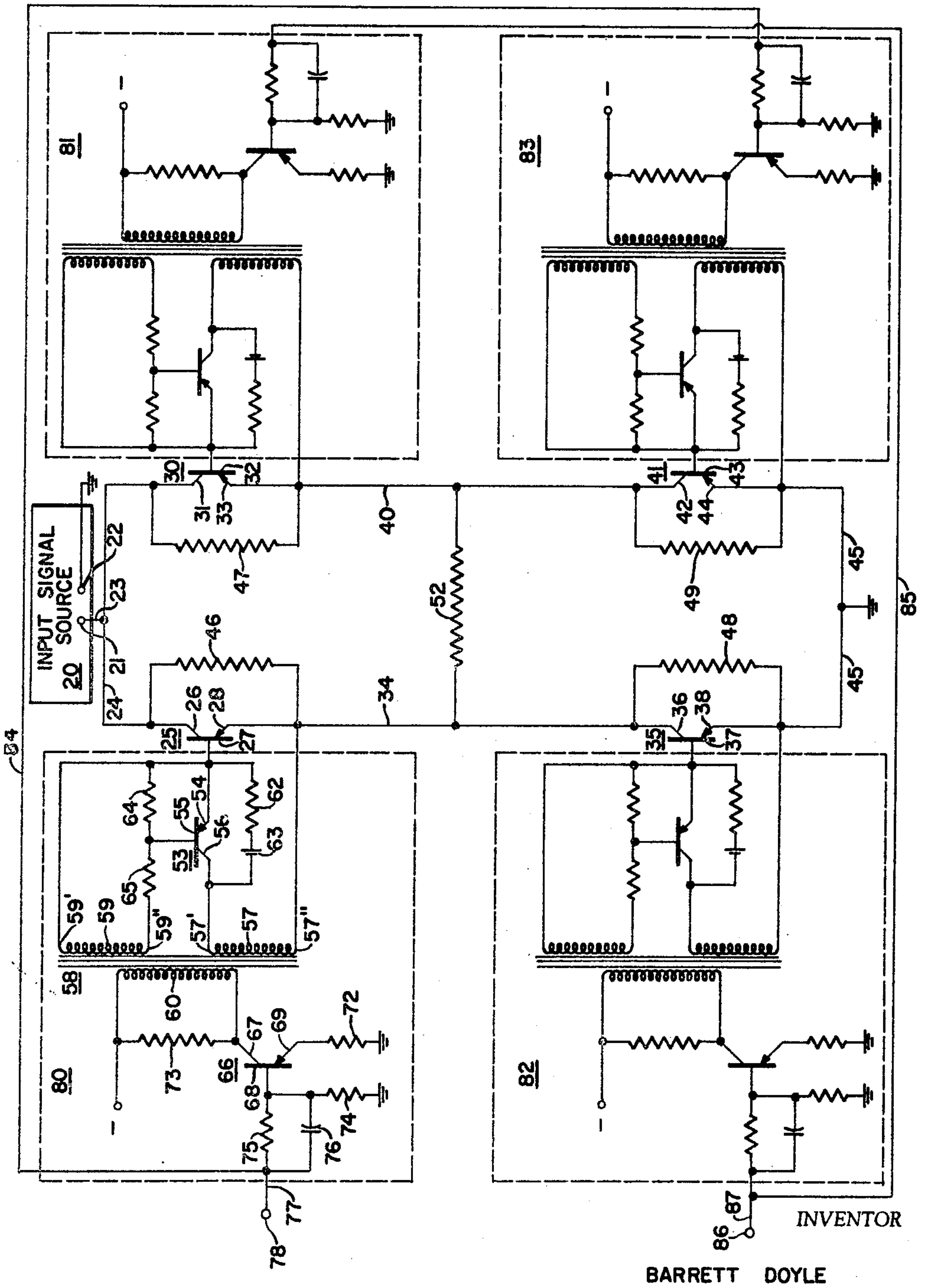
INVENTOR
BARRETT DOYLE
BY Roger W. Jensen
ATTORNEY

3,120,617
CONTROL DEVICE FOR TRANSISTORIZED BRIDGE CIRCUIT

Barrett Doyle, New Brighton, Minn., assignor to Minneapolis-Honeywell Regulator Company, Minneapolis, Minn., a corporation of Delaware
Filed Apr. 25, 1960, Ser. No. 24,503
12 Claims. (Cl. 307—88.5)

This invention refers to the improvement in transistorized circuits and particularly switching circuits wherein the transistor leakage currents may produce inaccurate operation. It is well known in the art that transistor leakage currents are affected by temperature changes and that these leakage currents approximately double for every 10° C. rise in temperature. While normally these leakage currents are very small, in the case of the grounded emitter transistor circuit the leakage currents are multiplied by the amplification factor of the transistor and can become a serious problem. This is particularly true in the bridge type circuit disclosed in this invention where, since the leakage currents for each transistor are different, these currents will unbalance the bridge and produce an undesirable and uncontrollable load current.

It is an object of this invention therefore to provide an improved control apparatus.

Another object of this invention therefore is to provide a transistorized switching circuit wherein the transistor leakage currents are minimized.

A further object of this invention is to provide a transistorized switching circuit with means for back biasing the transistors.

A further object of this invention is to provide a transistorized switching circuit with means for back biasing the transistors and further means for removing the back bias from the transistors when a switching signal is applied.

These and other objects of my invention will become apparent to those skilled in the art upon consideration of the accompanying specification, claims, and drawing of which the single figure is a schematic diagram of an embodiment of this invention.

Referring to the drawing there is shown an input signal source 20 having terminals 21 and 22. Terminal 22 is connected to a common conductor, in this case, ground, while terminal 21 is connected, by means of conductors 23 and 24, to the collector 26 of a transistor 25 having a base 27 and an emitter 28, and to the collector 31 of a transistor 30 having a base 32 and an emitter 33.

Emitter 28 of transistor 25 is connected by means of a conductor 34 to the collector 36 of a transistor 35 having a base 37 and an emitter 38. Emitter 33 of transistor 30 is connected by means of a conductor 40 to the collector 42 of a transistor 41 having a base 43 and an emitter 44. Emitters 38 and 44 of transistors 35 and 41 are connected by means of a conductor 45 to ground. Resistors 46, 47, 48 and 49 are connected from the collector to emitter of transistors 25, 30, 35 and 41 respectively. Conductors 34 and 40 connect a load device 52, in this case shown as a resistor, from the emitter 28 of transistor 25, to the emitter 33 of transistor 30.

It can be seen from the above description that transistors 25, 30, 35 and 41 form the sides of a bridge circuit, with the load device 52 connected across one diagonal and the input signal source 20 connected across the other.

It is to be understood that while in this specific embodiment of the invention transistors have been used, other current control devices, such as vacuum tubes or switches, could be used.

Base 27 of transistor 25 is directly connected to emitter 54 of a transistor 53 having a base 55 and a collector 56. The collector 56, of transistor 53, is connected by means of a transformer secondary winding 57, of a transformer 58 also having a secondary winding 59 and a primary winding 60, to the emitter 28 of a transistor 25. Transformer secondary winding 57 has end terminals 57′ and 57″, and secondary winding 59 has end terminals 59′ and 59″. The series combination of a resistor 62 and a biasing device 63, in this case a battery, is connected from emitter 54 to collector 56 of transistor 53. Base 55 and emitter 54 of the transistor 53, are connected together by the combination of a resistor 64 in parallel with the series combination of a resistor 65 and transformer secondary winding 59.

Primary winding 60 of transformer 58 is connected from a source of energizing potential (not shown) to a collector 67 of a transistor 66 also having a base 68 and an emitter 69. A resistor 73 is connected directly across primary winding 60. A resistor 72 connects emitter 69 of transistor 66 to ground. Base 68 of transistor 66 is connected by means of a resistor 74 to ground, and by means of the parallel combination of a resistor 75 and a capacitor 76, and a conductor 77 to a terminal 78 adapted to be connected to a source of activation or control signals (not shown).

Transistors 53 and 66, transformer 58, resistors 62, 64, 65 and 72 through 75, capacitor 76, and battery 63, connected as explained above form an activation, control, or bias device 80, for controlling the operation of transistor 25.

A plurality of additional control devices 81, 82 and 83 are used to control the operation of transistors 30, 35 and 41 respectively, and are substantially identical to control device 80. A conductor 77 and a conductor 84 connect the input terminal 78 of control device 80 to the input of control device 83, while a conductor 87 and a conductor 85 connect an input terminal 86 of control device 82 to the input of control device 81.

*Operation*

This circuit comprises, in a broad sense, a device for controlling the direction of current pulses through a load. Four transistors, or other switch devices, are connected to form the legs of a bridge circuit. The load is connected across one diagonal of the bridge and a source of input signals is connected across the other. By controlling the conduction of the transistors the direction of current flow through the load can be varied.

Associated with each transistor is a control, or activation, device which energizes its associated transistor whenever a control or activation signal is present. The control device performs a second function in that it provides a back bias for its associated transistor whenever a control signal is not present and thereby reduces the transistor leakage current.

In considering the operation of the circuit of the drawings, assume initially there is no control signal at either control input 78 or 86 and that the output of the input signal source 20 is a train of negative pulses. Since the control circuits 80, 81, 82 and 83 are substantially identical only the operation of control circuit 80 will be discussed. The function of control circuits 81, 82 and 83 will be described later.

With no control signal at terminal 78 the base 68 of transistor 66 will be at substantially the same potential as the emitter 69 and transistor 66 will be non-conducting or "off." Since transistor 66 is non-conducting the primary winding 60 of transformer 58 will be deenergized and there will be no induced signal in transformer secondaries 57 and 59. Transistor 53 will also be non-conducting therefore, since when there is no induced signal in secondary 59 the base 55 of transistor 53 is at approximately the same potential as the emitter 54.

When transistor 53 is "off," the base circuit of transistor 25 is open and hence transistor 25 will be non-conducting except for a small leakage current. While usually the small leakage current would have no serious effect on the circuit operation, in this case, where the transistor forms one of the legs of a bridge circuit, any leakage current can unbalance the bridge and produce an undesired load current. To minimize this leakage current, battery 63 is placed in series with the base circuit of the transistor 25 and in parallel with transistor 53. Since transistor 53 is "off" the battery 63 provides a back bias to the base to emitter circuit of transistor 25 and reduces the leakage current of this transistor to a minimum.

To further compensate for the undesirable effects of leakage currents, impedance devices 46, 47, 48 and 49, in this case resistors, are connected in parallel with the emitter to collector of transistors 25, 31, 35 and 41 respectively. These impedance devices are matched so that they are each of substantially the same value and each of them is of relatively high impedance as compared to the forward impedance of their respective transistors when the transistor is conducting and of relatively low impedance as compared to the forward impedance of their respective transistors when the transistor is non-conducting. When transistors 25, 31, 35 and 41 are "off" therefore, there will be a leakage current through each of the impedance elements 46, 47, 48 and 49. This leakage current will be substantially the same in each leg of the bridge, however, so that the bridge will be nearly balanced and the undesired load current will be minimized.

Assume now that a negative signal is applied to control input 78. This signal will produce a current flow from ground through resistor 72, emitter 69 to base 68 of transistor 66, the parallel combination of resistor 75 and capacitor 76, conductor 77, and the control input source (not shown) to ground. This base current will bias transistor 66 to its "on" or conducting state. With transistor 66 conducting, current will also flow from ground, through resistor 72, emitter 69 to collector 67 of transistor 66, the parallel combination of resistor 73 and transformer primary winding 60, and the source of energizing potential (not shown) to ground. The current flow through primary winding 60 of transformer 58 induces a voltage in both transformer secondary windings 57 and 59. The voltage induced in winding 59 is of such polarity that the base 55 of transistor 53 is negative with respect to the emitter 54. Current then flows from terminal 59′ of secondary winding 59, through the emitter 54 to base 55 of transistor 53, and resistor 65 to terminal 59″ of winding 59. This current flow biases transistor 53 to its "on" or conducting state. When transistor 53 conducts, battery 63 is shorted and the back bias is removed from transistor 25. The impedance device 62, in this case shown as a resistor, in series with battery 63 is of a relatively high value so that when transistor 53 conducts the current drain on battery 63 is very small. This greatly increases the life of battery 63.

The voltage induced in secondary winding 57 is of such polarity so as to make terminal 57′ of the winding negative with respect to terminal 57″. Since terminal 57″ of secondary winding 57 is connected to the emitter 28 of transistor 25, the voltage induced in this winding biases the emitter positive with respect to the base 27, and current flows from terminal 57″ of winding 57, through the emitter 28 to base 27 of transistor 25, the emitter 54 to collector 56 of transistor 53, to terminal 57′ of winding 57. This current flow through the emitter to base of transistor 25 biases this transistor to its "on" or conducting state. If transistor 25 is a power transistor it will require a comparatively large emitter to base current to drive this transistor to its fully conducting state. For this reason it is necessary that the base to emitter circuit impedance be as low as possible. Transistor 53, in series with the base to emitter of transistor 25, has a relatively low impedance when conducting and therefore the base to emitter impedance of resistor 25 is kept to a low value and the "turn on time" for this transistor is greatly improved.

The negative signal applied to terminal 78 is also applied, by means of conductor 84, to the input of control device 83. Since control device 83 is substantially identical to control device 80, this negative signal will bias transistor 41 to its "on" position. With transistors 25 and 41 conducting and with a train of negative pulses appearing at the output terminal 21 of the input signal source 20, current will flow from ground, through conductor 45, emitter 44 to collector 42 of transistor 41, conductor 40, load 52, conductor 34, emitter 28 to collector 26 of transistor 25, and conductors 24 and 23, to terminal 21 of the input signal source.

Similarly when the negative control signal is applied to terminal 86, it is coupled by means of conductors 87 and 85 to the inputs of control devices 82 and 81 respectively. Since these control devices are substantially identical to control device 81, transistors 35 and 30 will now be biased to their conducting states and a current will flow from ground, through conductor 45, emitter 38 to collector 36 of transistor 35, conductor 34, load 52, conductor 40, emitter 33 to collector 31 of transistor 30, and conductors 24 and 23 to negative terminal 21 of an input signal source.

It can be seen from the above discussion that when the control signal is alternated between terminals 90 and 91 the direction of load current reverses.

It is to be understood that while I have shown and described a specific embodiment of my invention, this is for the purpose of illustration only and my invention is to be limited solely by the scope of the appended claims.

I claim as my invention:

1. Apparatus of the class described comprising: first, second, third, and fourth transistors each having collector, base, and emitter electrodes; a source of input signals; means connecting said input signal source to the collector electrodes of said first and third transistors and to the emitter electrodes of said second and fourth transistors; means connecting the emitter electrode of said first transistor to the collector electrode of said second transistor; means connecting the emitter electrode of said third transistor to the collector electrode of said fourth transistor; load means connected from the emitter electrodes of said first transistor to the emitter electrode of said second transistor; first, second, third, and fourth control means each having input and output terminals and comprising in combination, fifth transistor means having collector, base and emitter electrodes, transformer means having primary and first and second secondary windings, means connecting the base and emitter electrodes of said fifth transistor in circuit with said secondary winding, means connecting the emitter and collector electrodes of said fifth transistor in circuit with said second secondary winding and the output terminals of said control means, bias means connected from collector to emitter electrodes of said fifth transistor, and means connecting said primary winding to the input terminals of said control means; means connecting the output terminals of said first, second, third and fourth control means from the base to emitter electrodes of said first, second, third, and fourth transistors respectively; first and second trigger input terminals adapted to be connected to a first and second source of input triggers; means connecting said first trigger input terminals to the input terminals of said first and fourth control means; and means connecting said second trigger input terminals to the input terminals of said second and third control means.

2. Apparatus of the class described comprising: first and second transistors each having collector, base, and emitter electrodes; means connecting the emitter electrode of said second transistor to the base electrode of said first transistor; transformer means having a primary winding and a first and second secondary winding; means connecting the first secondary winding of said transformer means in circuit with the base and emitter electrodes of said second transistor; means connecting the second secondary of said transformer means from the collector electrode of said second transistor to the emitter electrode of said first transistor; biasing means connected from the collector to emitter electrodes of said second transistor; load means; and means connecting said load means in circuit with the collector and emitter electrodes of said first transistor.

3. Apparatus of the class described comprising: first, second, third and fourth current control means each having input, output, and control electrodes; a source of input signals; means connecting said input signal source to the output electrodes of said first and third current control means and to the input electrodes of said second and fourth current control means; means connecting the input electrode of said first current control means to the output electrode of said second current control means; means connecting the input electrode of said third current control means to the output electrode of said fourth current control means; load means connected from the input electrode of said first current control means to the input electrode of said second current control means; first, second, third, and fourth control means each having input and output terminals and comprising in combination, fifth current control means having input, output and control electrodes, transformer means having primary and first and second secondary windings, means connecting the control and input electrodes of said fifth current control means in circuit with said first secondary winding, means connecting the input and output electrodes of said fifth current control means in circuit with said second secondary winding and the output terminals of said control means, bias means connected from output to input electrodes of said fifth current control means, and means connecting said primary winding to the input terminals of said control means; means connecting the output terminals of said first, second, third, and fourth control means from the control to input electrodes of said first, second, third, and fourth current control means respectively; first and second trigger input terminals adapted to be connected to a first and second source of input triggers; means connecting said first trigger input terminals to the input terminals of said first and fourth control means; and means connecting said second trigger input terminals to the input terminals of said second and third control means.

4. Apparatus of the class described comprising: first current control means; load means; means connecting said load means in circuit with said first current control means; control means comprising in combination, bias means, second current control means activation means having terminals adapted to be connected to a source of activating signals and including transformer means having first and second secondaries, means connecting said bias means in controlling relation with said first current control means, means connecting said second current control means across said bias means, and means connecting said activation means in controlling relation with said second current control means whereby said first transformer secondary controls the operation of said second current control means and said second transformer secondary operates through said second current control means to control said first current control means.

5. Apparatus of the class described comprising: first transistor means having input, output, and control electrodes; load means connected in circuit with the input and output electrodes of said first transistor means; control means comprising in combination, bias means, second transistor means having input, output and control electrodes, activation means having terminals adapted to be connected to a source of activating signals and including transformer means having first and second secondaries, means connecting said bias means in circuit with the control and input electrodes of said first transistor means, means connecting the input and output electrodes of said second transistor means in circuit with said bias means, means connecting said first transformer secondary of said activation means in circuit with the input and control electrodes of said second transistor means and means connecting said second transformer secondary of said activation means in circuit with the input and control electrode of said first transistor means through the input and output electrodes of said second transistor means.

6. Apparatus of the class described comprising: first, second, third, and fourth controllable switches, said switches being connected so as to form the sides of a bridge circuit; load means connected across one diagonal of said bridge circuit; input signal means connected across the other diagonal of said bridge circuit; first control means having input and output terminals and comprising in combination, transistor means having collector, base, and emitter electrodes, transformer means having primary and first and second secondary windings, means connecting the base and emitter electrodes of said transistor means in circuit with said secondary winding, means connecting the emitter and collector electrodes of said transistor means in circuit with said second secondary winding and the output terminals of said control means, bias means connected from collector to emitter electrodes of said transistor means, and means connecting said primary winding to the input terminals of said control means; second, third, and fourth control means, said second, third, and fourth control means being structurally the same as said first control means; means connecting the output terminals of said second, third, and fourth control means to said second, third, and fourth switch means respectively; means connecting the transformer primary windings of said first and fourth control means in parallel; and means connecting the transformer primary windings of said second and third control means in parallel.

7. Apparatus of the class described comprising: first and second transistors each having collector, base, and emitter electrodes; means connecting the emitter electrode of said second transistor to the base electrode of said first transistor; transformer means having a primary winding and a first and second secondary winding; means connecting the first secondary winding of said transformer means in circuit with the base and emitter electrodes of said second transistor; means connecting the second secondary of said transformer means from the collector electrode of said second transistor to the emitter electrode of said first transistor; bias means; impedance means; means connecting said bias means and said impedance means in series from the collector to emitter electrodes of said second transistor; load means; and means connecting said load means in circuit with the collector and emitter electrodes of said first transistor.

8. Apparatus of the class described comprising: first, second, third, and fourth controllable switches, said switches being connected so as to form the sides of a bridge circuit; first, second, third, and fourth impedance means connecting said first, second, third, and fourth impedances across said first, second, third, and fourth switches respectively; load means connected across one diagonal of said bridge circuit; input signal means connected across the other diagonal of said bridge circuit; first control means comprising in combination, bias means, fifth switch means, activation means having terminals adapted to be connected to a source of activating signals, means connecting said bias means in controlling relation with said first switch means, means connecting said fifth switch means across said bias means, and means connecting said activation means in controlling relation with said fifth switch means; second, third, and fourth control means, said second, third, and fourth control means being structurally the same as said first control means and connected to said second, third, and fourth switch means respectively; means connecting the terminals of said first and fourth activation means in parallel; and means connecting the terminals of said second and third activation means in parallel.

9. Apparatus of the class described comprising: first, second, third, and fourth transistors each having collector, base, and emitter electrodes; first, second, third, and fourth resistors; means connecting said first, second, third, and fourth resistors from the collector to emitter of said first, second, third, and fourth transistors respectively; a source of input signals; means connecting said input signal source to the collector electrodes of said first and third transistors and to the emitter electrodes of said second and fourth transistors; means connecting the emitter electrode of said first transistor to the collector electrode of said second transistor; means connecting the emitter electrode of said third transistor to the collector electrode of said fourth transistor; load means connected from the emitter electrode of said first transistor to the emitter electrode of said second transistor; first, second, third, and fourth control means each having input and output terminals and comprising in combination, fifth transistor means having collector, base and emitter electrodes, transformer means having primary and first and second secondary windings, means connecting the base and emitter electrodes of said fifth transistor in circuit with said secondary winding, means connecting the emitter and collector electrodes of said fifth transistor in circuit with said second secondary winding and the output terminals of said control means, bias means, fifth resistor means, means connecting said bias means and said fifth resistor means in series from the collector to emitter electrodes of said fifth transistor, and means connecting said primary winding to the input terminals of said control means; means connecting the output terminals of said first, second, third, and fourth control means from the base to emitter electrodes of said first, second, third, and fourth transitsors respectively; first and second trigger input terminals adapted to be connected to a first and second source of input triggers; means connecting said first trigger input terminals to the input terminals of said first and fourth control means; and means connecting said second trigger input terminals to the input terminals of said second and third control means.

10. Apparatus of the class described comprising: first, second, third and fourth controllable switches, said switches being connected so as to form the sides of a bridge circuit; load means connected across one diagonal of said bridge circuit; input signal means connected across the other diagonal of said bridge circuit; first control means comprising in combination, bias means, fifth switch means, activation means having terminals adapted to be connected to a source of activating signals and including transformer means having first and second secondaries, means connecting said bias means in controlling relation with said first switch means, means connecting said fifth switch means across said bias means, and means connecting said activation means in controlling relation with said first and fifth switch means whereby said first transformer secondary controls the operation of said fifth switch means and said second transformer secondary operates through said fifth switch means to control said first switch means; second, third and fourth control means being structurally the same as said first control means and connected to said second, third and fourth switch means respectively; means connecting the terminals of said first and fourth activation means in parallel; and means connecting the terminals of said second and third activation means in parallel.

11. Apparatus of the class described comprising: first, second, third, and fourth controllable switches, said switches being connected so as to form the sides of a bridge circuit; load means connected across one diagonal of said bridge circuit; input signal means connected across the other diagonal of said bridge circuit; first control means comprising in combination, bias means, fifth switch means, activation means having terminals adapted to be connected to a source of activating signals, means connecting said bias means to provide a reverse bias to said first switch means, means connecting said fifth switch means across said bias means, and means connecting said activation means in controlling relation with said fifth switch means the conduction of said fifth switch means removing the reverse bias from said first switch means; second, third, and fourth control means, said second, third, and fourth control means being structurally the same as said first control means and connected to said second, third, and fourth switch means respectively; means connecting the terminals of said first and fourth activation means in parallel; and means connecting the terminals of said second and third activation means in parallel.

12. Apparatus of the class described comprising: first switch means; load means; means connecting said load means in circuit with said first switch means; bias means; second switch means; activation means having terminals adapted to be connected to a source of activating signals said activation means providing a first and a second signal output; means connecting said bias means in controlling relation with said first switch means said bias means providing a reverse bias to said first switch means; means connecting said second switch means across said bias means, and means connecting said activation means in controlling relation with said first and second switch means whereby said first activation signal operates said second switch means and removes said reverse bias from said first switch means and said second activation signal is applied through said second switch means and operates said first switch means.

References Cited in the file of this patent

UNITED STATES PATENTS

| | | |
|---|---|---|
| 2,147,474 | Wagner et al. | Feb. 14, 1939 |
| 2,821,639 | Bright | Jan. 28, 1958 |
| 2,956,175 | Bothwell | Oct. 11, 1960 |